United States Patent [19]

Steeman et al.

[11] Patent Number: 4,772,671

[45] Date of Patent: Sep. 20, 1988

[54] PROCESS FOR THE PREPARATION OF A THERMOPLASTIC POLYMER

[75] Inventors: Reinard J. M. Steeman, Stein; Peter J. N. Meyer, Sittard, both of Netherlands

[73] Assignee: Stamicarbon B.V., Geleen, Netherlands

[21] Appl. No.: 919,242

[22] Filed: Oct. 15, 1986

[30] Foreign Application Priority Data

Oct. 17, 1985 [NL] Netherlands .................... 8502834

[51] Int. Cl.$^4$ .................................................. C08F 2/00
[52] U.S. Cl. ...................................... 526/216; 526/225; 526/233; 526/234; 526/272
[58] Field of Search ............... 526/216, 225, 233, 234, 526/272

[56] References Cited

U.S. PATENT DOCUMENTS

| | | |
|---|---|---|
| 2,980,653 | 4/1961 | Johnson . |
| 3,794,616 | 2/1974 | Denis et al. . |
| 4,180,637 | 12/1979 | Evani et al. ..................... 526/234 |
| 4,450,261 | 5/1984 | Chiao et al. ..................... 526/272 |

FOREIGN PATENT DOCUMENTS 0119414  9/1984  European Pat. Off. .

*Primary Examiner*—Joseph L. Schofer
*Assistant Examiner*—Peter D. Mulcahy
*Attorney, Agent, or Firm*—Cushman, Darby & Cushman

[57] ABSTRACT

A process for the preparation of a thermoplastic polymer on the basis of an alkenyl-aromatic monomer and an unsaturated dicarboxylic acid comprises the addition of 10 to 100 ppm relative to the polymer wt. % of an acid during polymerization. Suitable acids that can be applied are carboxylic acids, and sulphur- and/or phosphorus-containing acids or their mixtures.

7 Claims, No Drawings

PROCESS FOR THE PREPARATION OF A THERMOPLASTIC POLYMER

The invention relates to a process for the preparation of a thermoplastic polymer on the basis of an alkenyl-aromatic monomer and an unsaturated dicarboxylic anhydride.

Copolymers from alkenyl-aromatic monomers and unsaturated dicarboxylic anhydrides are known. Examples of these copolymers are the copolymers from styrene and maleic anhydride (SMA). The preparation of these copolymers can be effected both via batch processes and via continuous processes. The first commercial SMA copolymers were low-molecular products with molecular weights below 5000. These types are applied in, for instance, floor shampoos, floor waxes, emulsion paints and dispersing agents.

Besides these low-molecular products there also are high-molecular SMA copolymers. These are of importance in, for instance, the automotive industry and in household articles.

Copolymers of styrene and/or α-methyl styrene and maleic anhydride are usually prepared by methods that are customary for, for instance, mass polymerization or solution polymerization. Thus, for instance, according to U.S. Pat. No. 2,971,939 copolymers of styrene and maleic anhydride can be obtained be reacting both monomers, styrene and maleic anhydride (MA), in the presence of a peroxide. Polymerization control is improved when using a solvent, for instance methylethylketone, acetone, xylene, dioxane, ethylbenzene, dimethylformamide or toluene.

A 50:50 (molar) copolymer can be obtained by batchwise copolymerization of styrene and maleic anhydride, for instance by precipitation polymerization of styrene and maleic anhydride in aromatic solvents. Copolymers with less maleic anhydride can be obtained if in continuous copolymerization a mixture of much styrene and little maleic anhydride is introduced into a polymerization vessel at high temperature with vigorous stirring, while stimultaneously removing an identical amount of the polymerization mixture from the vessel (A. W. Hansen and R. L. Zimmermann, Industrial Engineering Chemistry 49, p. 1803, 1957).

High-molecular SMA polymers can be processed by extrusion and injection moulding. The theoretical upper limit of the MA content is 50 mol % (alternating copolymers). On account of their high softening point (220° C.), however, these products have poor processing properties. In addition, thermal decomposition of the copolymer takes place at the high temperature at which processing is carried out. This is attended by undesired evolution of carbon dioxide. For this reason the SMA copolymers with a relatively high maleic anhydride content are difficult to process. Said decarboxylation decreases with decreasing MA content and usually does not present an impediment for copolymers containing less than 18 mol% maleic anhydride.

In itself, it is known to protect SMA copolymers against this thermal decomposition.

U.S. Pat. No. 3,794,616 mentions organic and inorganic acids of phosphorus, sulphur, boron and silicon which, added to the SMA, protect the latter against thermal decomposition.

These acids are used in an amount varying from 0.01 to 10 wt.% relative to the copolymer and they are added during compounding. By preference amounts varying from 0.1 to 1.0 wt.% relative to the copolymer are used. U.S. Pat. No. 3,794,616 further mentions, in column 2, lines 53-55, the possibility of adding the acid during preparation of the copolymer, but this is stated to be a less suitable method.

A disadvantage of addition during compounding of such amounts of the compounds mentioned in U.S. Pat. No. 3,794,616 is that the SMA thus protected against decomposition sticks to the processing equipment, such as extruders, injection moulding equipment and rolls, which greatly impedes processing of SMA-containing moulding compounds. Also as a result of this, corrosion may affect the processing equipment in which SMA is processed. Moreover, properties of the polymer such as mechanical strength and temperature resistance are adversely affected.

The object of the invention is to obtain a thermoplastic moulding compound on the basis of a copolymer of an alkenyl-aromatic monomer and an unsaturated dicarboxylic anhydride that does not exhibit the disadvantages referred to.

According to the invention a thermoplastic polymer on the basis of an alkenyl-aromatic monomer and an unsaturated dicarboxylic acid is obtained by effecting the polymerization in an acid environment. The presence during polymerization of 10-100 ppm, relative to the copolymer, of an acid suffices for an optimum result. By preference 30-100 ppm is used.

Applicants has also found that the presence during polymerization of an acid in amounts in excess of 0.05 wt.% does not yield the result aimed at.

Surprisingly, it has been found that the addition of these small amounts of acid during the polymerization to copolymers of an alkenyl-aromatic monomer and an unsaturated dicarboxyl anhydride does prevent thermal decomposition of the copolymers thus produced, even if it is found after preparation and further processing that there is virtually no acid left in the copolymer, but does not give rise to sticking of the moulding compound to the processing machines, and does not cause corrosion, either, whereas addition to the ready copolymer does.

Suitable acids that can be applied according to the invention are carboxylic acids and organic or inorganic acids of phosphorus, sulphur, halogens, boron and silicon or mixtures of these.

Examples of suitable acids are acetic acid, citric acid, benzoic acid, oxalic acid, acrylic acid, adipic acid, glutaric acid, propionic acid and derivatives such as halogen- and/or alkyl- and/or aryl-substituted acids. Use may also be made of boric acid, metaboric acid, silicic acid and derivatives of these such as phenylboric acid and diphenylsilicic acid.

Particularly suitable are organic and inorganic acids of phosphorus and sulphur such as phosphoric acid, phosphorous acid, pyrophosphoric acid, alkyl- and/or aryl-substituted phosphoric acids, esters of phosphorous acid such as di(2-ethylhexyl)phosphorous acid, sulphuric acid, sulphurous acid, alkyl- and/or aryl-substituted sulphonic acids such as p-toluene sulphonic acid, methane sulphonic acid, pyridine sulphonic acid, naphthalene sulphonic acid and sulphanilic acid. Halogen-substituted derivatives may also be used.

By preference use is made of phosphoric acid and paratoluene sulphonic acid.

As alkenyl-aromatic monomers, in the process according to the invention use can be made of styrene, α-methyl styrene, paramethyl styrene or mixtures of these.

As unsaturated dicarboxylic anhydrides, in the process according to the invention use can be made of maleic anhydride, chloromaleic anhydride, dichloromaleic anhydride, citraconic anhydride, cyclohexyl maleic anhydride, benzyl maleic anhydride, itaconic anhydride, phenyl maleic anhydride, aconitic anhydride, propyl maleic anhydride, 1.2-diethyl maleic anhydride and mixtures of these. By preference maleic anhydride is used.

Moulding compounds prepared according to the invention are suitable for many applications. Thus, many kinds of objects can be made from them, such as, for instance, dashboards for cars and cabinets and housings for electronic and domestic equipment.

The invention will be elucidated on the basis of the following examples and comparative experiments, without being restricted thereto.

Comparative example A (blank without acid, 28 mol% MA)

A reactor with a reactor volume of 0.004 m³ is continuously charged with a feed consisting of 42 wt.% styrene, 13 wt.% maleic anhydride (MA), 0.2 wt.% benzoyl peroxide (BPO), 44.8 wt.% methylethylketone (MEK). The reaction temperature is 110° C. and the residence time 4 hours. Upon completion a homogeneous solution is obtained.

The product is recovered from the solution by mixing 1 part of the homogeneous solution with 3 parts acetone. 1 Part of the resulting mixture is subsequently poured out into 5 parts methanol. The flocculated polymer is filtered off, washed out with 1 part methanol and dried in a vacuum drying stove at 110° C. during 8 hours.

The amount of $CO_2$ evolved upon heating of the polymer at 260° C., expressed in percents of the amount started from, is measured. The amount of $CO_2$ measured was 1.5 wt.%.

EXAMPLES 1 THROUGH 22

(28 mol% MA with acids)

The copolymer of styrene and maleic anhydride is prepared in the same way as in Comparative example A, an amount of acid now being added to the feed. The amounts of $CO_2$ evolved that were measured are presented in Tables I and II.

TABLE I

| | Various acids | |
|---|---|---|
| Acid | Concentration (ppm rel. to copolymer) | $CO_2$ release* (wt. %) |
| 1. Acetic acid | 400 | 0.82 |
| 2. Acetic acid | 80 | 0.30 |
| 3. Acetic acid | 20 | 0.20 |
| 4. Citric acid | 600 | 0.68 |
| 5. Citric acid | 80 | 0.24 |
| 6. Benzoic acid | 120 | 0.28 |
| 7. Benzoic acid | 80 | 0.24 |
| 8. Benzoic acid | 30 | 0.20 |
| 9. Oxalic acid | 400 | 0.37 |
| 10. Oxalic acid | 40 | 0.25 |
| 11. Phosphoric acid | 200 | 0.15 |
| 12. Phosphoric acid | 30 | 0.13 |
| 13. Paratoluene sulphonic acid | 250 | 0.08 |
| 14. Paratoluene sulphonic acid | 30 | 0.06 |

TABLE I-continued

| | Various acids | |
|---|---|---|
| Acid | Concentration (ppm rel. to copolymer) | $CO_2$ release* (wt. %) |

*$CO_2$ release measured on heating of the polymer at 260° C. during 30 minutes.

TABLE II

| Influence of acid concentration (28% MA in the copolymer) | | |
|---|---|---|
| Acid | Concentration (ppm rel. to copolymer) | $CO_2$ release* (wt. %) |
| 15. Phosphoric acid | 200 | 0.15 |
| 16. Phosphoric acid | 100 | 0.14 |
| 17. Phosphoric acid | 30 | 0.13 |
| 18. Phosphoric acid | 20 | 0.17 |
| 19. Paratoluene sulphonic acid | 250 | 0.08 |
| 20. Paratoluene sulphonic acid | 100 | 0.08 |
| 21. Paratoluene sulphonic acid | 30 | 0.06 |
| 22. Paratoluene sulphonic acid | 20 | 0.11 |

*$CO_2$ release measured on heating of the polymol at 260° C. during 30 minutes.

Comparative example B (Blank without acid, 22 mol% MA)

A reactor with a reactor volume of 0.004 m³ is continuously charged with a feed consisting of 58.56 wt.% styrene, 10.30 wt.% MA, 31.00 wt.% MEK and 0.14 wt.% BPO. The reaction temperature is 110° C. and the residence time 4 hours. Upon completion a homogeneous solution is obtained.

The product is recovered from the solution by mixing 1 part of the homogeneous solution with 3 parts acetone. 1 Part of the resulting mixture is subsequently poured out into 5 parts methanol. The flocculated polymer is filtered off, washed out with 1 part methanol and dried in a vacuum drying stove at 110° C. during 8 hours.

The amount of $CO_2$ evolved in 30 minutes upon heating of the polymer at 260° C., expressed in percents of the amount started from, is measured.

The amount measured was 1.3 wt.% $CO_2$.

EXAMPLES 23 THROUGH 30

(22 mol% MA with acids)

The copolymer of styrene and maleic anhydride is prepared in the same way as in Comparative example B, an amount of acid also being added to the feed. The measured amounts of $CO_2$ released and presented in Table III.

TABLE III

| Influence of acid concentration (22% MA) | | |
|---|---|---|
| Acid | Concentration (ppm rel. to copolymer) | $CO_2$ release* (wt. %) |
| 23. Phosphoric acid | 200 | 0.16 |
| 24. Phosphoric acid | 100 | 0.13 |
| 25. Phosphoric acid | 30 | 0.09 |
| 26. Phosphoric acid | 20 | 0.15 |
| 27. Paratoluene sulphonic acid | 200 | 0.08 |
| 28. Paratoluene sulphonic acid | 100 | 0.08 |
| 29. Paratoluene sulphonic acid | 30 | 0.06 |
| 30. Paratoluene | 20 | 0.09 |

TABLE III-continued

Influence of acid concentration (22% MA)

| Acid | Concentration (ppm rel. to copolymer) | $CO_2$ release* (wt. %) |
|---|---|---|
| sulphonic acid | | |

*$CO_2$ release measured on heating of the polymer at 260° C. during 30 minutes.

What is claimed is:

1. Process for the preparation of a thermoplastic polymer on the basis of an alkenyl-aromatic monomer and an unsaturated dicarboxylic anhydride, characterized in that the polymerization is effected in the presence of 10-100 ppm of an acid relative to the polymer,
wherein a carboxylic acid and/or a sulphur—and/or phosphorus—containing acid is added.

2. Process according to claim 1, characterized in that 30-100 ppm of the acid relative to the polymer is added.

3. Process according to claim 1, characterized in that acetic acid, citric acid, benzoic acid, oxalic acid, phosphoric acid or paratoluene sulphonic acid is added.

4. Process according to claim 3, characterized in that phosphoric acid or paratoluene sulphonic acid is added.

5. Process according to claim 1, characterized in that the alkenyl-aromatic monomer is styrene and/or α-methyl styrene.

6. Process according to claim 1, characterized in that the unsaturated dicarboxylic anhydride is maleic anhydride.

7. Process according to claim 1, characterized in that a styrene-maleic anhydride copolymer with 18-50 mol% maleic anhydride and 82-50 mol% styrene is prepared.

* * * * *